(12) United States Patent  
Matsumoto et al.

(10) Patent No.: US 8,018,468 B2  
(45) Date of Patent: Sep. 13, 2011

(54) IMAGE SIGNAL PROCESSOR, IMAGE SIGNAL PROCESSING METHOD FOR USE IN THE SAME, AND PROGRAM

(75) Inventors: Tatsuhiko Matsumoto, Tokyo (JP); Yutaka Imai, Tokyo (JP); Takehiro Nakatsue, Kanagawa (JP)

(73) Assignee: Sony Corporation, Tokyo (JP)

( * ) Notice: Subject to any disclaimer, the term of this patent is extended or adjusted under 35 U.S.C. 154(b) by 788 days.

(21) Appl. No.: 12/100,773

(22) Filed: Apr. 10, 2008

(65) Prior Publication Data

US 2008/0259370 A1    Oct. 23, 2008

(30) Foreign Application Priority Data

Apr. 18, 2007   (JP) ................. 2007-109456

(51) Int. Cl.
| | |
|---|---|
| H04N 1/46 | (2006.01) |
| H04N 1/60 | (2006.01) |
| G09G 5/00 | (2006.01) |
| G09G 5/02 | (2006.01) |
| G06F 15/00 | (2006.01) |
| G06K 9/00 | (2006.01) |
| G06K 9/40 | (2006.01) |
| G06K 9/32 | (2006.01) |
| H04N 5/445 | (2006.01) |

(52) U.S. Cl. ........ 345/589; 345/581; 345/591; 345/600; 345/639; 348/441; 348/557; 348/671; 348/674; 358/1.1; 358/518; 358/523; 382/167; 382/254; 382/274; 382/300; 430/357; 430/359

(58) Field of Classification Search .......... 345/426–428, 345/581, 586, 589–591, 600–601, 604–606, 345/618, 639; 348/68, 71, 254, 441, 453, 348/557, 560, 602, 612, 671–672, 674, 687, 348/761, 807; 358/1.1, 2.1, 509, 518–523

See application file for complete search history.

(56) References Cited

U.S. PATENT DOCUMENTS

| | | | | |
|---|---|---|---|---|
| 5,157,506 A | * | 10/1992 | Hannah | 382/167 |
| 2004/0119977 A1 | * | 6/2004 | Takahashi et al. | 356/406 |
| 2009/0102968 A1 | * | 4/2009 | Doser et al. | 348/467 |
| 2009/0284554 A1 | * | 11/2009 | Doser | 345/690 |
| 2009/0322779 A1 | * | 12/2009 | Tomizawa et al. | 345/590 |
| 2010/0289810 A1 | * | 11/2010 | Doser et al. | 345/589 |

FOREIGN PATENT DOCUMENTS

| | | |
|---|---|---|
| JP | 2000-321686 | 11/2000 |
| JP | 2006-033575 | 2/2006 |

OTHER PUBLICATIONS

Japanese Office Action issued on Feb. 26, 2009, for corresponding Japanese Patent Application JP 2007-109456.

* cited by examiner

Primary Examiner — Wesner Sajous  
(74) Attorney, Agent, or Firm — K&L Gates LLP

(57) ABSTRACT

Disclosed herein is an image signal processor for carrying out conversion into an xvYCC signal by using a photograph film as a material, the image signal processor including: acquisition means for acquiring print film concentration data based on said photograph film; generation means for generating spectral data on an image on a screen previously presumed based on spectral concentration characteristics of colors of a positive film having an image projected on said screen, a spectral distribution of a projection light source, and the print film concentration data; arithmetical operation means for arithmetically operating an XYZ tri-stimulus value corresponding to the spectral data; and conversion means for converting the XYZ tri-stimulus value into the xvYCC signal.

8 Claims, 4 Drawing Sheets

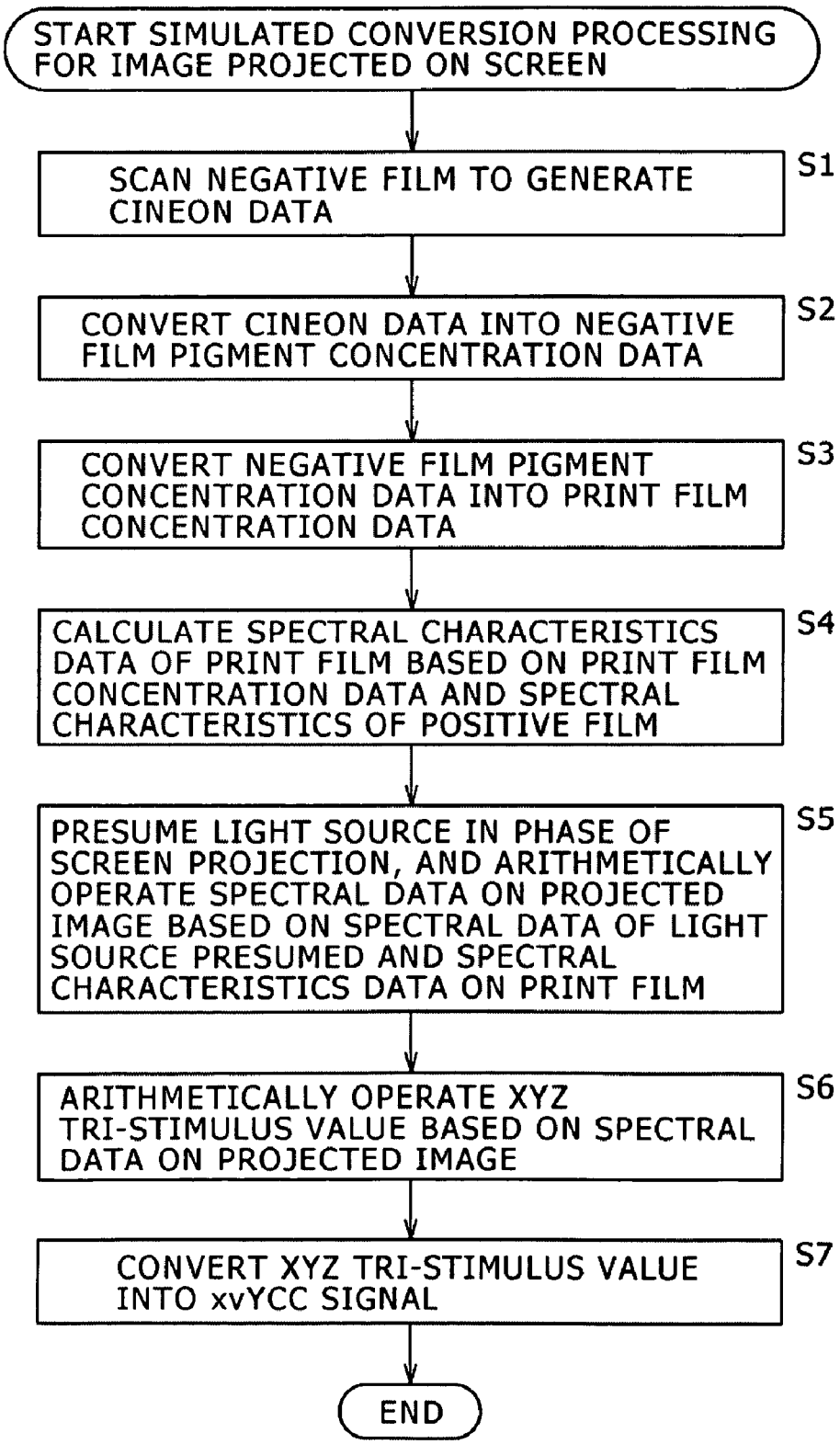

IMAGE SIGNAL PROCESSOR, IMAGE SIGNAL PROCESSING METHOD FOR USE IN THE SAME, AND PROGRAM

CROSS REFERENCES TO RELATED APPLICATIONS

The present application claims priority to Japanese Patent Application JP 2007-109456 filed in the Japan Patent Office on Apr. 18, 2007, the entire contents of which is being incorporated herein by reference.

BACKGROUND

The present application relates to an image signal processor, an image signal processing method for use in the same, and a program, and more particularly to an image signal processor, an image signal processing method for use in the same, and a program which are suitable for being used when an xvYCC signal is generated based on a photograph film of a movie.

Hereinafter, an image signal which can be treated by an image display apparatus typified by a television receiver has been signals of the three primary colors of red, green and blue (hereinafter referred to as "RGB signals"), or a component signal which is obtained through conversion based on the RGB signals and which is composed of a luminance signal and a chroma (color difference) signal (hereinafter referred as "a Y'PbPr signal").

Thus, the primary color point which is decided based on a chromaticity point of a cathode ray tube (CRT) which has been adopted in the image display apparatus for a very long time is used in the RGB signals treated in the related art image display apparatus. In other words, the RGB signals are standardized on the premise of being displayed on the CRT. Therefore, a color space capable of being expressed by the RGB signals is enough as long as it can cover a color reproduction range.

However, in recent years, a plasma display device, a liquid crystal display device and the like each of which has a color reproduction range wider than each of a color reproduction range of the CRT, and a color space capable of being expressed by the RGB signals or the component signal have appeared as an alternative of the CRT. When the related art ROB signals or component signal is inputted to the plasma display device or liquid crystal display device having such a wide color reproduction range, the color reproduction range of the plasma display device or the liquid crystal display device can not be sufficiently utilized.

In order to cope with the problem described above, the applicant of this patent application has already proposed an image signal capable of expressing the color space wider than that which the RGB signals or the component signal can express. This technique, for example, is disclosed in Japanese Patent Laid-Open No. 2006-33575. Also, this image signal is enacted as a new extended color space international standard, xvYCC, for motion picture (IEC 61966-2-4). Hereinafter, the image signal complying with this international standard will be referred to as an xvYCC signal.

Along with the standardization of the xvYCC signal, the wide color gamut promotion for the image has been advanced so that the plasma display device, the liquid crystal display device and the like can respond to the xvYCC signal. Actually, television receivers advocating that they respond to the xvYCC signal begin to come into wide use (hereinafter referred to as "x.v.Color-compliant television receivers").

As has been described so far, the side color gamut promotion on the hardware side typified by the appearance of the x.v.Color-compliant television receiver has been advanced. However, paying attention to a software side, that is, the image signal, although the xvYCC signal is standardized, actually, the number of video contents each using the xvYCC signal is still very small.

Thus, in order to increase the number of video contents each using the xvYCC signal, a movie film as a material thereof is being watched. The color reproduction range of the movie film is wide to exceed that of each of the related art RGB signals and component signal, and is narrower than that of the xvYCC signal. Therefore, it is expected that the xvYCC signal is generated based on the movie film without compressing the color reproduction range which the movie film originally has.

Note that, in the related art as well, there exists a technique for converting the ROB signals or the like into predetermined ones based on the movie film. However, with the related art concerned, the conversion is carried out so as to further narrow the color reproduction range. As a result, the color space which the movie film originally has can not be sufficiently reproduced with the RGB signals obtained after completion of the conversion.

SUMMARY

The present application has been made in the light of the circumstances as described above, and it is therefore desirable to provide an image signal processor, an image signal processing method for use in the same, and a program each of which is capable of converting an XYZ tri-stimulus value into an xvYCC signal without narrowing a color reproduction range of a movie film by using the movie film as a material.

According to an embodiment, there is provided an image signal processor for carrying out conversion into an xvYCC signal by using a photograph film as a material, the image signal processor including: an acquisition section for acquiring print film concentration data based on the photographing film; a generation section for generating spectral data on an image on a screen previously presumed based on spectral concentration characteristics of colors of a positive film having an image projected on the screen, a spectral distribution of a projection light source, and the print film concentration data; an arithmetical operation section for arithmetically operating an XYZ tri-stimulus value corresponding to the spectral data; and a conversion section for converting the XYZ tri-stimulus value into the xvYCC signal.

According to another embodiment there is provided an image signal processing method for use in an image signal processor for carrying out conversion into an xvYCC signal by using a photograph film as a material, the image signal processing method including the steps of: acquiring print film concentration data based on the photograph film; generating spectral data on an image on a screen previously presumed based on spectral concentration characteristics of colors of a positive film having an image projected on the screen, a spectral distribution of a projection light source, and the print film concentration data; arithmetically operating an XYZ tri-stimulus value corresponding to the spectral data; and converting the XYZ tri-stimulus value into the xvYCC signal.

According to still another embodiment, there is provided a program for controlling a computer for carrying out conversion into an xvYCC signal by using a photograph film as a material, the program instructing the computer to execute processing including the steps of: acquiring print film concentration data based on the photograph film; generating spectral data on an image on a screen previously presumed based on spectral concentration characteristics of colors of a positive film having an image projected on the screen, a spectral distribution of a projection light source, and the print film concentration data; arithmetically operating an XYZ tri-stimulus value corresponding to the spectral data; and converting the XYZ tri-stimulus value into the xvYCC signal.

According to an embodiment, the print film concentration data based on the photograph film is acquired, and the spectral data on the image on the screen previously presumed is generated based on the spectral concentration characteristics of the colors of the positive film projected on the screen, the spectral distribution of the projection light source, and the print film concentration data. Also, the XYZ tri-stimulus value corresponding to the spectral data is arithmetically operated and is then converted into the xvYCC signal.

According to an embodiment, the image signal can be generated by using the photograph film as a material.

In addition, according to another embodiment, the XYZ tri-stimulus value can be converted into the xvYCC signal without narrowing the color reproduction range by using the movie film as a material.

Additional features and advantages are described herein, and will be apparent from the following Detailed Description and the figures.

BRIEF DESCRIPTION OF THE FIGURES

FIG. 4 is a flow chart explaining simulated conversion processing for an image projected on the screen.

DETAILED DESCRIPTION

Figure 1:
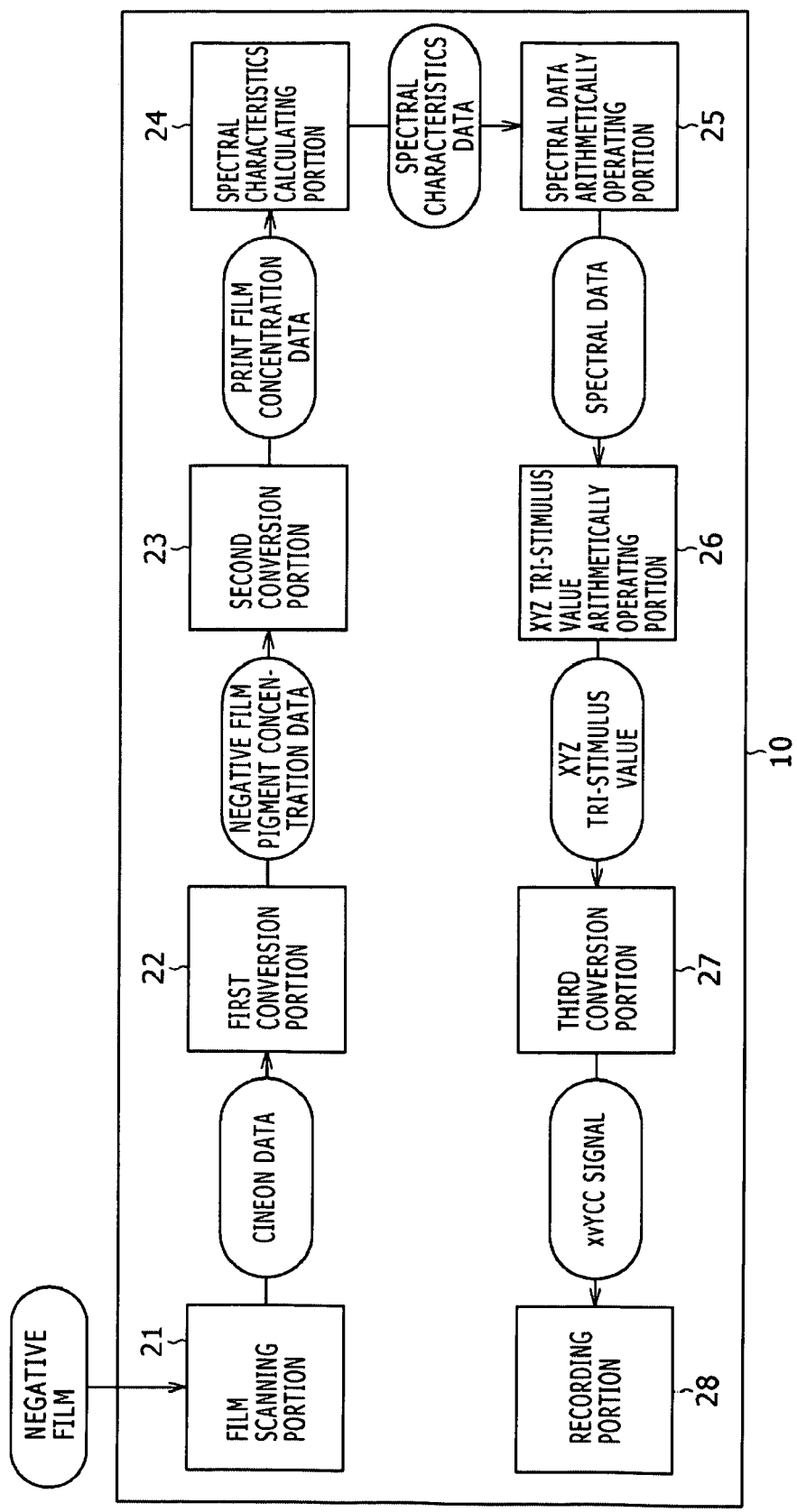
FIG. 1 is a block diagram showing a configuration of an image signal processor according to an embodiment.

According to an embodiment, an image signal processor (for example, an image signal processor 10 shown in FIG. 1) includes an acquisition section (for example, composed of a film scanning portion 21 to a second conversion portion 23 of FIG. 1), a generation section (for example, composed of a spectral characteristics calculating portion 24 and a spectral data arithmetically operating portion 25 of FIG. 1), an arithmetically operation section (for example, composed of an XYZ tri-stimulus value arithmetically operating portion 26 of FIG. 1), and a conversion section (for example, composed of a third conversion portion 27 of FIG. 1). In this case, the acquisition section acquires print film concentration data based on a photograph film. The generation section generates spectral data on an image on a screen previously presumed based on spectral concentration characteristics of colors of a positive film having an image projected on the screen, a spectral distribution of a projection light source, and print film concentration data. The arithmetic operation section arithmetically operates an XYZ tri-stimulus value corresponding to the spectral data. Also, the conversion section converts the XYZ tri-stimulus value into an xvYCC signal.

The image signal processor described above can further include a recording section (for example, composed of a recording portion 28 of FIG. 1) for recording the xvYCC signal.

According to another embodiment, each of an image signal processing method and a program includes the steps of: acquiring print film concentration data based on a photograph film (for example, composed of Steps S1 to S3 shown in FIG. 4); generating spectral data on an image on a screen previously presumed based on spectral concentration characteristics of colors of a positive film projected on the screen, a spectral distribution of a projection light source, and print film concentration data (for example, composed of Steps S4 and S5 of FIG. 4); arithmetically operating an XYZ tri-stimulus value corresponding to the spectral data (for example, composed of Steps S6 of FIG. 4); and converting the XYZ tri-stimulus value into an xvYCC signal(for example, composed of Step 7 of FIG. 4).

An embodiment will be described in detail hereinafter with reference to the accompanying drawings.

FIG. 1 shows a configuration of an image signal processor according to an embodiment. This image signal processor 10 simulates a process until a photograph film (hereinafter referred to as "a negative film"), of a movie, which is inputted as a material is projected on a screen in a movie theater to generate an xvYCC signal, and records the xvYCC signal thus generated in a recording medium.

Therefore, when an image corresponding to the xvYCC signal generated in the image signal processor 10 is displayed on an x.v.Color-compliant television receiver, a viewer looking at a screen of the x.v.Color-compliant television receiver can view a color reproduction range similar to that of an image projected on the screen in the movie theater.

The image signal processor 10 is composed of a film scanning portion 21, a first conversion portion 22, a second conversion portion 23, a spectral characteristics calculating portion 24, a spectral data arithmetically operating portion 25, an XYZ tri-stimulus value arithmetically operating portion 26, a third conversion portion 27, and a recording portion 28. In this case, the film scanning portion 21 generates cineon data as digital data by scanning a negative film. The first conversion portion 22 converts the cineon data into negative film pigment concentration data. The second conversion portion 23 converts the negative film pigment concentration data into print film concentration data. The spectral characteristics calculating portion 24 calculates spectral characteristic data of the print film based on the print film concentration data. The spectral data arithmetically operating portion 25 arithmetically operates spectral data when an image is projected on the screen based on the spectral characteristic data. In addition, the XYZ tri-stimulus value arithmetically operating portion 26 arithmetically operates an XYZ tri-stimulus value based on the spectral data. Also, the third conversion portion 27 converts the XYZ tri-stimulus value into an xvYCC signal. Also, the recording portion 28 records the xvYCC signal in a recording medium.

The film scanning portion 21 optically measures a concentration of the negative film. Also, the film scanning portion 21 generates cineon data composed of 10-bit digital data with which each of pigment concentrations of cyan(C), magenta (M) and yellow(Y) is expressed in the form of a value ranging from 0 to 2.2 at 0.02 intervals as expressed by the following expression (1). Here, the cineon data means digital data which is obtained for the purpose of synthesizing an image actually photographed with computer graphics or the like, or executing predetermined image processing for the image actually photographed.

Printing Density=0.002*CV Where CV=code value
(10bit 0 to 1023) LAD445(10 bit) Laboratory
Aim Density Middle: 470(10 bit) 182.27926e+
289ray Shadows: 95(10 bit)2black Highlights:
685(10 bit)90−14700te     (1)

It is noted that a general film scanner (for example, Grass Valley™ Spirit 4K high-performance film scanner manufactured by Thomson Corporation) can be used in the film scanning portion 21.

The first conversion portion 22 converts the cineon data inputted thereto from the film scanning portion 21 into negative film pigment concentration data by using the following expression (2).

When VIDEO>0.081, Linear=[(VIDEO+0.099)/
1.099]^(1/0.45) When VIDEO<0.081,
Linear=VIDEO/4.5 Log=(685/1023)+
(300/1023)·log$_{10}$[(Linear+0.0109)/1.0109]     (2)

Figure 2:
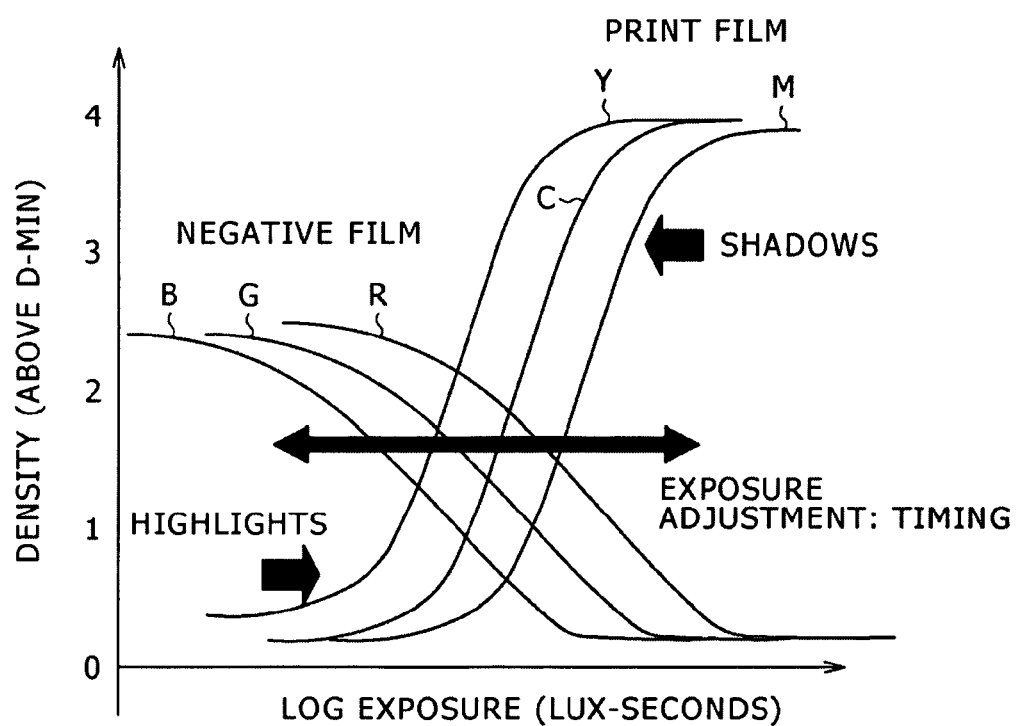
FIG. 2 is a graphical representation showing a relationship among RGB concentrations of a negative film, YCM concentrations of a print film, and an exposure timing.

The second conversion portion 23 converts the negative film pigment concentration data inputted thereto from the first conversion portion 22 into print film conversion data based on a relationship between RGB concentrations of the image in the negative film, YCM concentrations of the image in the print film, and an exposure timing which are shown in FIG. 2. This conversion is carried out by simulating a process for printing a negative film obtained through the photograph into a print film (positive film) to be set in a cinema projector in the movie theater, including a quantity of light for printing. Thus, this conversion is a progress which exerts a large influence on reproduction of a gradation of an image projected on the screen.

Note that, in FIG. 2, magenta(M), cyan(C) and yellow(Y) of the image in the print film show one-to-one correspondence to red(R), green(G) and blue(B) of the image in the negative film, respectively. Therefore, the concentration of red(R) of the negative film can be converted into the concentration of magenta(M) of the image in the print film. The concentration of green(G) of the image in the negative film can be converted into the concentration of cyan(C) of the image in the print film. Also, the concentration of blue(B) of the negative film can be converted into the concentration of yellow(Y) of the image in the print film.

In addition, the exposure timing is adjusted so that a suitable relationship is obtained between white balance and a concentration in a gray portion.

It is noted that the relationship between the RGB concentrations of the negative film and the YCM concentrations of the image in the print film is previously produced based on the photosensitive characteristics, of the general positive film, disclosed by a film company or the like. However, although the photosensitive characteristics, of the actual positive film are slightly different in gradation among the colors of cyan, magenta and yellow, the example shown in FIG. 2 is obtained on the basis that the photosensitive characteristics of the colors of cyan, magenta and yellow of the image in the print film are identical to one another.

Figure 3:
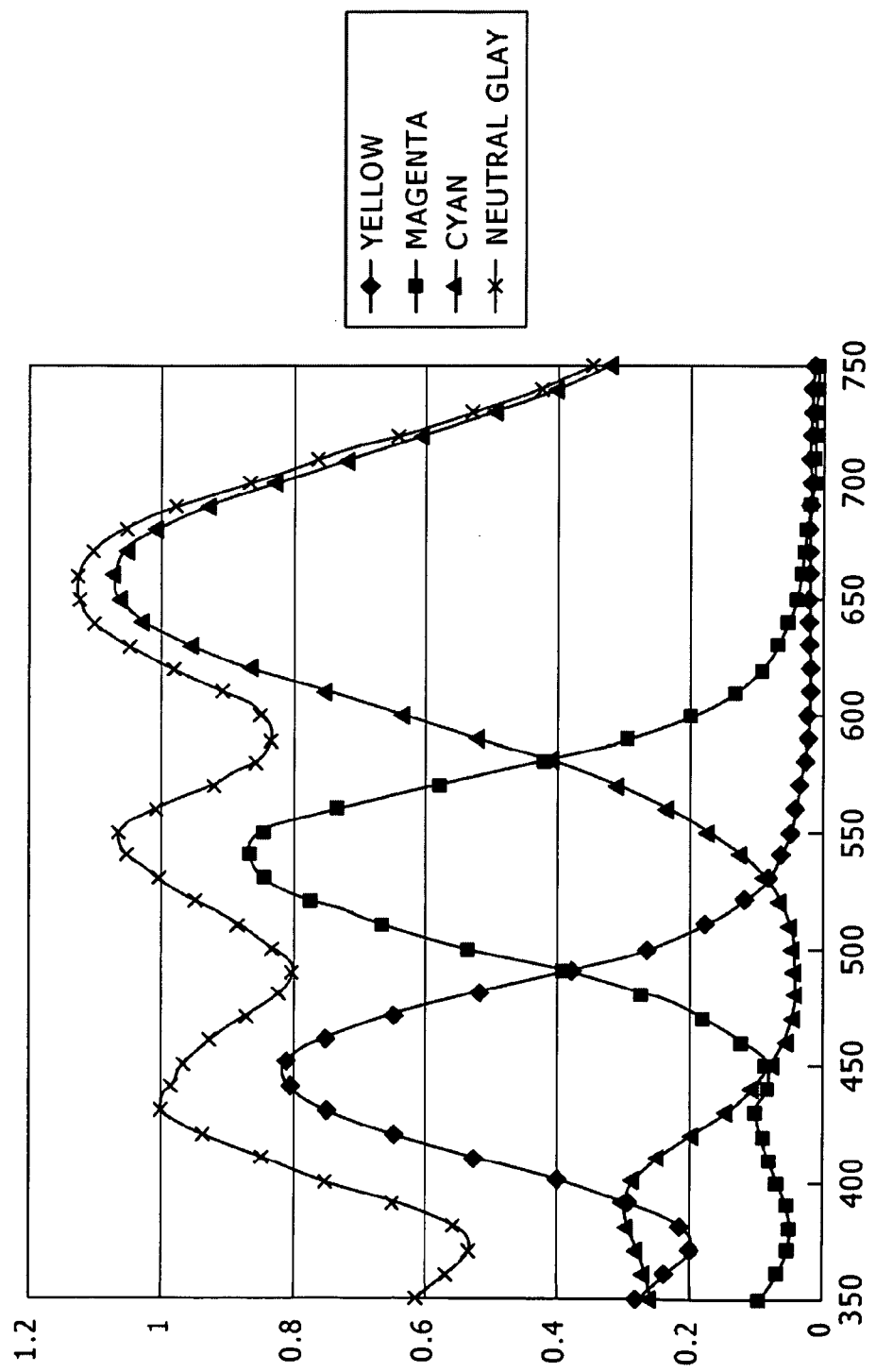
FIG. 3 is a graphical representation showing spectral characteristics of colors of cyan, magenta and yellow of a positive film.

The spectral characteristics calculating portion 24 calculates the spectral characteristic data of the print film based on the spectral concentration characteristics, as shown in FIG. 3, of the colors of cyan, magenta and yellow of the general positive films, and the print film concentration data inputted thereto from the second conversion portion 23. Here, the spectral concentration characteristics are generally disclosed by a film company or the like.

The spectral data arithmetically operating portion 25 carries out a process obtained by simulating a state in which an image in the print film is projected on the screen by the cinema projector. That is to say, the spectral data arithmetically operating portion 25 arithmetically operates the spectral data on the projected image based on a spectral distribution of the projection light source previously presumed, and spectral characteristic data of the print film inputted thereto from the spectral characteristics calculating portion 24. It is noted that a D55 light source, a xenon light source, a metal halide lamp, or the like is given as the projection light source previously presumed. Also, it is noted that the spectral reflectivity by the screen may be presumed, and may be added to the arithmetic operation for the spectral data on the projected data.

The XYZ tri-stimulus value arithmetically operating portion 26 arithmetically operates an XYZ tri-stimulus value based on the spectral data on the projected image inputted thereto from the spectral data arithmetically operating portion 25 by using a conversion equation regulated in Japanese Industrial Standard (JIS). In addition, the XYZ tri-stimulus value arithmetically operating portion 26 corrects the coordinates of a white point in correspondence to the luminances. Moreover, the XYZ tri-stimulus value arithmetically operating portion 26 also arithmetically operates an XYZ tri-stimulus value of a white point of the light source.

The third conversion portion 27 generates an xvYCC signal based on the tri-stimulus value inputted thereto from the XYZ tri-stimulus value arithmetically operating portion 26 by using a conversion equation regulated in a new extended color space international standard, xvYCC, for motion picture (IEC 61966-2-4). Note that, when a white point of the projection light source presumed in the spectral data arithmetically operating portion 25 is different from that of the D65 light source as a standard in a new extended color space international standard, xvYCC, for motion picture (IEC 61966-2-4), the third conversion portion 27 also carries out correction for the white point of the projection light source presumed in the spectral data arithmetically operating portion 25. In addition, the third conversion portion 27 may also generate the RGB signals based on the XYZ tri-stimulus value.

The recording portion 28 records the xvYCC signal inputted thereto from the third conversion portion 27 in the recording medium. It is noted that the recording portion 28 may also record the XYZ tri-stimulus value arithmetically operated by the XYZ tri-stimulus value arithmetically operating portion 26 in the recording medium, or may also record the RGB signals generated based on the XYZ tri-stimulus value in the third conversion portion 27 in the recording medium.

Next, an operation of the image signal processor 10 (hereinafter referred to as "simulated conversion processing for screen projection") will be described in detail with reference to a flow chart shown in FIG. 4.

In Step S1, the film scanning portion 21 scans the negative film inputted as a material to generate the cineon data, and outputs the resulting cineon data to the first conversion portion 22.

In Step S2, the first conversion portion 22 converts the cineon data inputted thereto from the film scanning portion 21 into the negative film pigment concentration data, and outputs the resulting negative film pigment concentration data to the second conversion portion 23.

In Step S3, the second conversion portion 23 converts the negative film pigment concentration data inputted thereto from the first conversion portion 22 into the print film concentration data. The second conversion portion 23 also adjusts the exposure timing during this conversion processing. Also, the second conversion portion 23 outputs the resulting print film concentration data to the spectral characteristics calculating portion 24.

In Step S4, the spectral characteristics calculating portion 24 calculates the spectral characteristic data on the image in the print film based on the print film concentration data inputted thereto from the second conversion portion 23, and the spectral characteristics of the general positive film. Also, the spectral characteristics calculating portion 24 outputs the resulting spectral characteristic data on the image in the print film to the spectral data arithmetically operating portion 25.

In Step S5, the spectral data arithmetically operating portion 25 arithmetically operates the spectral data on the projected image based on the spectral distribution of the projection light source previously presumed, and the spectral characteristic data, on the image in the print film, inputted thereto from the spectral characteristics calculating portion 24. Also, the spectral data arithmetically operating portion 25 outputs the resulting spectral data on the projected image to the XYZ tri-stimulus value arithmetically operating portion 26.

In Step S6, the XYZ tri-stimulus value arithmetically operating portion 26 arithmetically operates the XYZ tri-stimulus value based on the spectral data, on the projected image, inputted thereto from the spectral data arithmetically operating portion 25. Also, the XYZ tri-stimulus value arithmetically operating portion 26 outputs the resulting XYZ tri-stimulus value to the third conversion portion 27.

In Step S7, the third conversion portion 27 generates the xvYCC signal based on the XYZ tri-stimulus value inputted thereto from the XYZ tri-stimulus value arithmetically operating portion 26. The xvYCC signal generated through Steps S1 to S7 described above is recorded in the recording medium by the recording medium 28. The description of the simulated conversion processing for an image projected on the screen executed by the image signal processor 10 has been completed so far.

According to the simulated conversion processing for an image projected on the screen which has been described so far, there is simulated the process until the negative film obtained through the photograph is printed onto the positive film to generate the print film, and the image in the print film is projected on the screen. As a result, the xvYCC signal can be generated by using the movie film as the material without narrowing the color reproduction range of the movie film. Also, when the xvYCC signal thus generated is supplied to the x.v.Color-compliant television receiver, the image in which the gradation and color space of the image projected on the screen in the movie theater can be displayed on the screen of the x.v.Color-compliant television receiver.

Now, the series of processing described above can be executed either by the hardware configured as shown in FIG. 1 or by software. When the series of processing described above is executed by the software, a program constituting the software is installed from a program recording medium either in a computer incorporated in the dedicated hardware or in, for example, a general purpose personal computer or the like capable of carrying out various functions.

In the personal computer, a CPU loads a program for example, installed in a hard disc into a RAM and executes the program, thereby executing the series of processing described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image signal processor for carrying out conversion into an xvYCC signal by using a photograph film as a material, the image signal processor comprising:
   acquisition means for acquiring print film concentration data based on said photograph film;
   generation means for generating spectral data on an image on a screen previously presumed based on spectral concentration characteristics of colors of a positive film having an image projected on said screen, a spectral distribution of a projection light source, and the print film concentration data;
   arithmetical operation means for arithmetically operating an XYZ tri-stimulus value corresponding to the spectral data; and
   conversion means for converting the XYZ tri-stimulus value into the xvYCC signal.

2. The image signal processor according to claim 1, further comprising recording means for recording the xvYCC signal.

3. The image signal processor according to claim 2, wherein said recording means also records the XYZ tri-stimulus value.

4. The image signal processor according to claim 2, wherein said conversion means also converts the XYZ tri-stimulus value into three primary color signals, and said recording means also records the three primary color signals.

5. The image signal processor according to claim 1, wherein said acquisition means converts data on an image in said photograph film as a negative film into cineon data as digital data by scanning said photograph film, converts the cineon data into negative film pigment concentration data, and converts the negative film pigment concentration data into the print film concentration data, thereby acquiring the print film concentration data.

6. An image signal processing method for use in an image signal processor for carrying out conversion into an xvYCC signal by using a photograph film as a material, said image signal processing method comprising:
   acquiring print film concentration data based on said photograph film;
   generating spectral data on an image on a screen previously presumed based on spectral concentration characteristics of colors of a positive film having an image projected on said screen, a spectral distribution of a projection light source, and the print film concentration data;
   arithmetically operating an XYZ tri-stimulus value corresponding to the spectral data; and
   converting the XYZ tri-stimulus value into the xvYCC signal.

7. A program encoded in a non-transitory computer-readable storage medium for controlling a computer for carrying out conversion into an xvYCC signal by using a photograph film as a material, said program instructing the computer to execute processing comprising the steps of:
   acquiring print film concentration data based on said photograph film;
   generating spectral data on an image on a screen previously presumed based on spectral concentration characteristics of colors of a positive film having an image projected on said screen, a spectral distribution of a projection light source, and the print film concentration data;
   arithmetically operating an XYZ tri-stimulus value corresponding to the spectral data; and
   converting the XYZ tri-stimulus value into the xvYCC signal.

8. An image signal processor for carrying out conversion into an xvYCC signal by using a photograph film as a material, the image signal processor comprising:

an acquisition configured to acquire print film concentration data based on said photograph film;

a generation section configured to generate spectral data on an image on a screen previously presumed based on spectral concentration characteristics of colors of a positive film having an image projected on said screen, a spectral distribution of a projection light source, and the print film concentration data;

an arithmetical operation section configured to arithmetically operate an XYZ tri-stimulus value corresponding to the spectral data; and a conversion section configured to convert the XYZ tri-stimulus value into the xvYCC signal.

* * * * *